Oct. 7, 1930.     H. FUSS     1,777,692
CALCULATING APPARATUS
Filed April 20, 1925
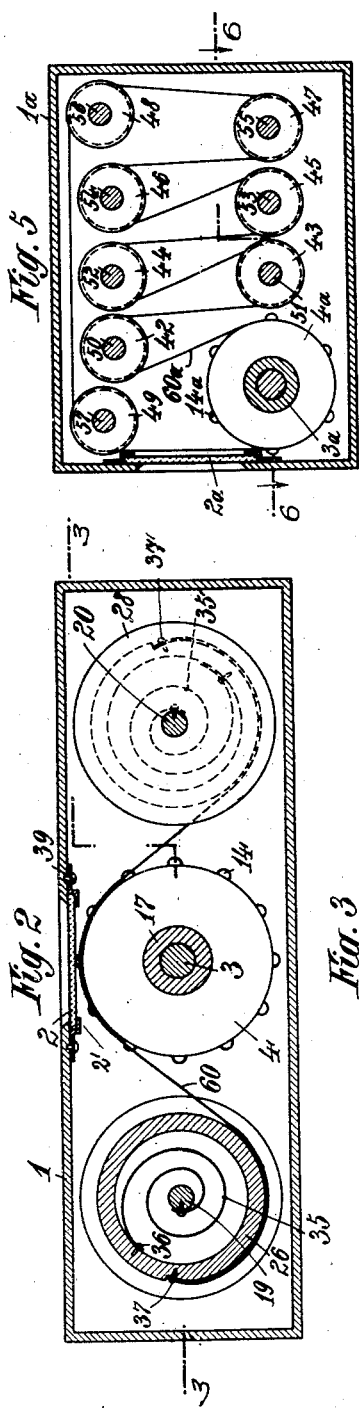
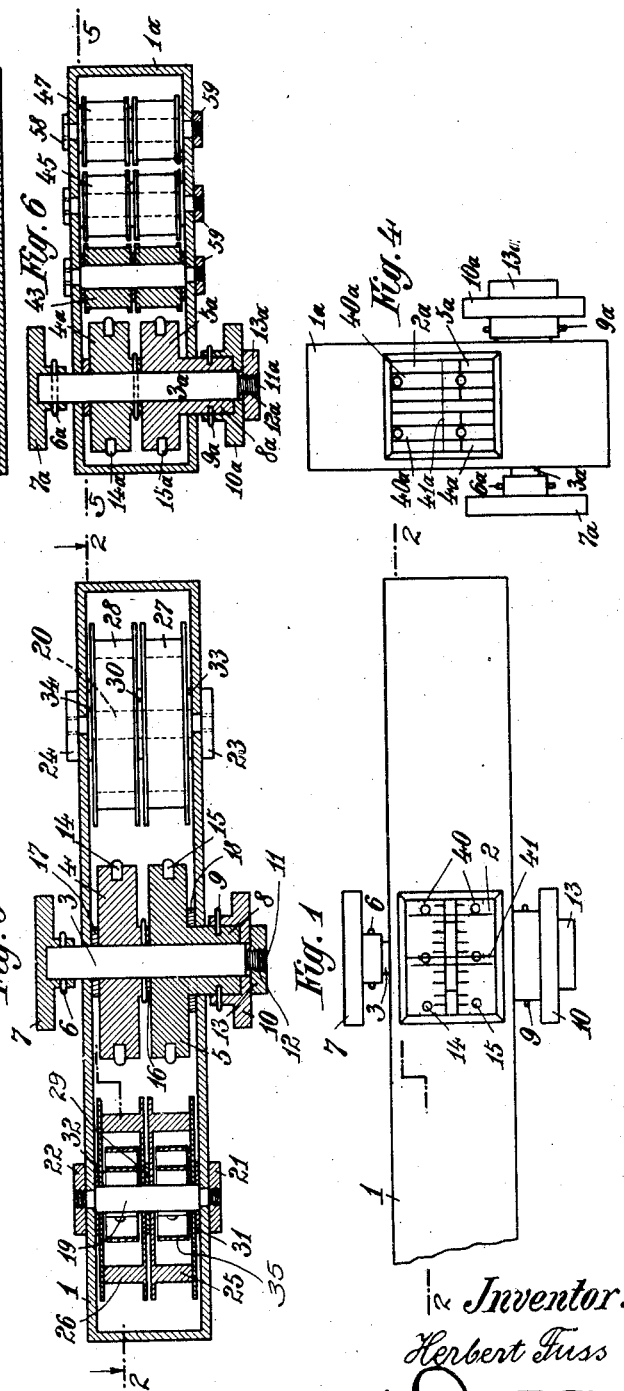
Inventor:
Herbert Fuss
by [signature]
Atty.

Patented Oct. 7, 1930

1,777,692

UNITED STATES PATENT OFFICE

HERBERT FUSS, OF NEUBABELSBERG, NEAR BERLIN, GERMANY

CALCULATING APPARATUS

Application filed April 20, 1925, Serial No. 24,481, and in Germany April 29, 1924.

My invention relates to calculating apparatus and more especially to apparatus in which bands provided with logarithmical graduations are adapted to be moved over discs or drums independently of one another.

It is an object of my invention to provide an instrument of the kind described which, while being small in size, avoids confusion in reading the result of a calculation and which operates accurately.

In the drawings affixed to this specification and forming part thereof, two forms of an apparatus embodying my invention are illustrated diagrammatically by way of example.

In the drawings:

Figs. 1 to 3 illustrate a calculating apparatus equipped with bands fixed by their ends, Fig. 1 being a plan view, Fig. 2 a section on the line 2—2 in Fig. 1, and Fig. 3 being a section on the line 3—3 in Fig. 2.

Figs. 4 to 6 illustrate a calculating apparatus equipped with endless bands,

Fig. 4 being a plan view,

Fig. 5 a section on the line 5—5 in Fig. 6, and

Fig. 6 being a section on the line 6—6 in Fig. 5.

Referring first to Figs. 1 to 4, 1 is a preferably rectangular casing, the top of which has an opening. A plate or window 2 of transparent material is arranged beneath the opening and held by a frame 2' and screws or rivets 39.

3 is a spindle arranged beneath the central line of the plate 2, and 4, 5 are two drums, mounted on the spindle, the drum 4 being fixed and the drum 5 being rotatable thereon. An operating knob or handle 7 is secured on one end of the spindle which projects from the casing 1. A boss or hub of the free drum 5 projects from the opposite side of the casing, and a knob 10 is secured to this boss by pins 9. A threaded end 11 of the spindle 3 projects beyond the knob 10 and a nut 13 is screwed on the thread 12. 16, 17 and 18 are washers inserted between the drums 4 and 5 and the walls of the casing 1, respectively, 14 and 15 are teeth in the form of pins having rounded ends which project from the circumferential faces or peripheries of the drums 4 and 5, midway between their edges. In this instance each drum is equipped with twelve pins but it will be understood that the number of pins may vary.

19 and 20 are journals arranged at the ends of the casing 1, and extending parallel to the spindle 3 and being secured against rotation by nuts 21, 22 and 23, 24, respectively, at both ends. 25, 26 and 27, 28 are pairs of drums, and are mounted on the pins 19 and 20, respectively, for rotation against the action of spiral springs, 35, 35', respectively, which are secured to the journals at 19 and to the drums at 36. Washers 29 and 30 are inserted between the drums of each pair, and washers 31, 32 and 33, 34, respectively, are inserted between the drums and walls of the casing.

The drums 25, 26, 27 and 28 are provided with flanges at both ends, and bands on which a logarithmic graduation is imprinted, are secured to one of the drums at either end and pass over the drums on the spindle 3. In the instance shown in the drawing, two such bands are provided, the band 60 carried by the drums 26, 4 and 28 and secured to the drums 26 and 28 at 37 and 37', respectively, being shown in Fig. 2. The bands have central rows of perforations adapted to cooperate with the teeth 14, 15 on the drums 4 and 5 in feeding the bands. Grooves 40 formed in the plate permit the ends of the teeth 14, 15 and, if necessary, part of the drums 4, 5 to travel past the plate. A mark 41 on the plate extends parallel to the axis of the spindle 3.

In operation the nut 13 is unscrewed so that the drum 5 can be rotated independently of the drum 4, and the band not shown carried on the drums 25, 5 and 27 can be set in relation to the band 60 on the drums 26, 4, and 28 which remains stationary. When the bands have been adjusted as desired, the nut 13 is drawn tight so that both bands now move in unison when the spindle 3 is rotated by means of the knob 7 or 10, and the result of the calculation can be read below the mark 41. As mentioned, any suitable means apart from the clamping device exerting axial pressure on the drums may be used for positively connecting these drums, and the means for effecting such connection do not per se constitute a part of the present invention. The spiral springs in the drums tend to wind the bands on the respective drums so that tension is put on the springs by unwinding the bands.

In the modification shown in Figs. 4 to 6 such parts as correspond to those of the device above described are marked with the same reference numerals to which the index "a" is affixed. Here, the bands, one of which is indicated at $60^a$, are endless and slung around drums $4^a$, $5^a$, and sets of drums 42, 43, 44, 45, 46, 47, 48, and 49 which are mounted for free rotation on journals 50, 51, 52, 53, 54, 55, 56 and 57 extending across the casing $1^a$ parallel to the spindle $3^a$ secured by nuts 58 and 59 at opposite sides of the casing. Each journal supports a pair of drums as will be seen in Fig. 6. The object of arranging so many drums is to enable bands of considerable length to be employed.

The bands on the drums $4^a$ and $5^a$ can be fed with regard to one another after the nut $13^a$ has been unscrewed, and fed in unison by rotating the knob $7^a$ or $10^a$ after the nut $13^a$ has been set, as described with reference to Figs. 1 to 4, whereupon the result can be read below the mark $41^a$ on the plate $2^a$.

I wish it to be understood that I do not desire to be limited to the exact details of construction shown and described, for obvious modifications will occur to a person skilled in the art. Any number of bands 60 or $60^a$ may be arranged in parallel on a corresponding number of drums.

I claim:—

In a calculator of the slide rule type, wherein adjacent bands having mutually cooperating graduations are trained over drums arranged within a casing and a reading opening is provided in the casing adjacent to a pair of intermediate manually operable drums, a plurality of radially projecting pins arranged on the periphery of each operating drum centrally between its ends; said bands each having a central row of perforations co-acting with the said pins to prevent the bands from slipping, the arrangement being such that accurate relative readings may be taken from adjacent edges of the bands.

In testimony whereof I affix my signature.

HERBERT FUSS.